(12) United States Patent
Doshi et al.

(10) Patent No.: US 8,667,177 B2
(45) Date of Patent: Mar. 4, 2014

(54) INTERFACE GROUPING FOR MEDIA ACCESS CONTROL ADDRESS PINNING IN A LAYER TWO NETWORK

(75) Inventors: Sanjiv Doshi, San Jose, CA (US); Jagadish Grandhi, Mountain View, CA (US); Rajagopalan Subbiah, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 539 days.

(21) Appl. No.: 12/840,072

(22) Filed: Jul. 20, 2010

(65) Prior Publication Data

US 2011/0271009 A1   Nov. 3, 2011

Related U.S. Application Data

(60) Provisional application No. 61/328,945, filed on Apr. 28, 2010.

(51) Int. Cl.
*G06F 13/00*   (2006.01)
(52) U.S. Cl.
USPC ............................................. 709/242

(58) Field of Classification Search
USPC .............................................. 709/242
See application file for complete search history.

(56) References Cited

U.S. PATENT DOCUMENTS 8,155,150 B1 *   4/2012   Chung et al. ................. 370/475

* cited by examiner

*Primary Examiner* — Robert B Harrell
(74) *Attorney, Agent, or Firm* — Shumaker & Sieffert, P.A.

(57) ABSTRACT

An example network device includes a set of interfaces, a control unit, and a forwarding engine. The control unit includes an interface group information repository that stores data defining interface groups. Each interface group includes one or more interfaces. The forwarding engine includes a media access control (MAC) address repository that stores a mapping of a first interface to a source MAC address, and a MAC address management module that determines whether an interface group to which the first interface is assigned is the same interface group as the interface group to which a second interface is assigned. The control unit is configured to receive a layer two (L2) communication via the second interface, wherein the L2 communication includes the source MAC address. The forwarding engine dynamically updates the MAC address repository based on the determination of the MAC address management module.

20 Claims, 6 Drawing Sheets

| MAC TABLE | | | |
|---|---|---|---|
| MAC ADDRESS | AGING? | INTERFACE | GROUP ID |
| aa.bb.cc.dd.ee | 0 | gi-1/3/0.2 | 1 |
| ff.aa.dd.ee.ff | 1 | gi-1/3/0.1 | 0 |
| cc.cc.dd.ee.aa | 0 | gi-1/1/1.1 | 0 |
| dd.aa.dd.ee.dd | 1 | gi-2/0/0.1 | 2 |
| ⋮ | ⋮ | ⋮ | ⋮ |

INTERFACE GROUPING FOR MEDIA ACCESS CONTROL ADDRESS PINNING IN A LAYER TWO NETWORK

This application claims the benefit of U.S. Provisional Application No. 61/328,945, filed Apr. 28, 2010, which is hereby incorporated by reference in its entirety.

TECHNICAL FIELD

The invention relates to computer networks and, more particularly, to forwarding communications within a computer network.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a data link layer device is a customer premises equipment (CPE) device, such as a switch, modem, Ethernet card, or wireless access point. Traditional L2 networks include Ethernet networks, Asynchronous Transfer Mode (ATM) networks, Frame Relay networks, networks using High Level Data Link Control (HDLC), Point-to-Point (PPP) connections, PPP sessions from Layer 2 Tunneling Protocol (L2TP) tunnels, and Virtual Local Area Networks (VLANs).

In L2 networks, an L2 device responsible for forwarding network traffic, such as an L2 switch or an L2-enabled router, operates to forward network traffic to an L2 network address reachable by a particular port of the L2 device. If the specific port by which the L2 network address is reachable is not know, the L2 device typically "floods" L2 traffic destined for that network address to all ports of the L2 device. Such flooding, however, consumes bandwidth within the L2 network, which is generally undesirable. In some instances, the L2 device may be manually provisioned such that the L2 network addresses reachable by each of the ports are statically defined by an administrator. However, manually configuring the L2 device may result in significant administrative overhead, especially in large L2 networks where a single L2 device may forward network traffic to a large number of remote network devices, each having a unique L2 network address that must be manually configured on the L2 device. Furthermore, each time a remote network device moves such that it is reachable by a different port of the L2 device, the L2 device must be reconfigured by the administrator. This requires additional overhead and may prevent a remote network device from receiving packets until the administrator reconfigures the L2 device.

Other L2 devices are configured to dynamically learn which network addresses are reachable through the different ports of the device. Such an L2 device typically floods a copy of network traffic to the ports of the L2 device when the network traffic is destined for a network address that has not previously been seen, and therefore not learned, by the L2 device. Specifically, the L2 device floods all network traffic bound for a particular destination address until the L2 device receives some network traffic originated from the address, at which time the L2 device is able to "learn" the specific port by which the network address is reachable. As a result, the L2 device forwards future network traffic bound for the address to the particular port and no longer needs to flood the network traffic. Dynamic learning of L2 network addresses reachable by specific ports may significantly reduce administrative overhead associated with configuring L2 devices, especially in large L2 networks. However, dynamic learning may expose the L2 devices to certain security risks, such as L2 address spoofing. That is, a different remote network device may spoof a legitimate L2 network address and cause the L2 device to redirect packets to the spoofing remote network device rather than the legitimate remote network device.

To minimize administrative overhead while also minimizing the possibility of network address spoofing, some networks employ a hybrid form of L2 network address learning. Specifically, the L2 device may be configured to initially dynamically learn network addresses, as described above, but then prevent any learned network address from being re-learned on a different port of the L2 device. This is typically referred to as "pinning" the network address to the particular port of the L2 device such that the network address is not released until certain conditions are met, such as an expiration period. For example, the network address may be pinned to a particular port until no network traffic is received from the network address via the particular port within a configurable period of time, e.g., five minutes. As another example, the network address may be pinned to a particular port until an administrator reconfigures the L2 device to associate the network address with a different port of the L2 device.

Pinning of network addresses to ports of an L2 device also presents certain challenges. For example, by pinning the network address to a particular port, a multi-homed remote network device, e.g., a remote network device reachable by the L2 device via two or more different network paths associated with two or more different ports of the L2 device, cannot easily make use of the planned network redundancy. Instead, if a first network path becomes unavailable, the multi-homed remote network device must wait until the configurable period of time has expired and the L2 device subsequently permits the network address of the remote network device to be re-learned on the different port or until an administrator reconfigures the L2 device to associate the network address of the remote network device with the other port of the L2 device.

SUMMARY

In general, this disclosure is directed to techniques for managing Media Access Control (MAC) address learning in a layer two (L2) network device, where L2 refers to the second layer of the Open System Interconnection (OSI) model, also referred to as the data link layer. For example, this disclosure describes segregating interfaces of an L2 network device into a plurality of interface groups. In some examples, the L2 network device applies different mechanisms for learning MAC addresses based, at least in part, upon the interface group to which each interface belongs.

For example, when a packet having a previously unseen MAC address is first received, dynamic MAC address learning techniques are applied to associate the MAC address with the interface on which the packet is received. Similarly, when the MAC address is subsequently seen in a packet arriving on a different interface, dynamic MAC address learning is applied to associate the MAC address with the second interface if the second interface is defined within the same interface group as the first interface. That is, the MAC address is removed from the MAC table of the first interface and inserted in a MAC table of the second interface, thereby allowing dynamic re-learning of the MAC address. However, if the first interface and the second interface are not defined within the same interface group, then dynamic re-learning is prohibited and the MAC address remains associated with the first interface on which the packet was originally seen. That is, MAC addresses are "pinned" to a set of interfaces defined within an interface group and dynamic MAC learning is allowed to be applied between interfaces of the interface group, but not between interfaces of different interface groups. In this manner, the techniques may be viewed as applying a modified hybrid MAC learning approach.

In one example, a method includes receiving a layer two (L2) communication via a first interface of a set of interfaces of a network device, wherein the L2 communication includes a source media access control (MAC) address of a remote network device, and wherein the first interface belongs to a first interface group of a set of interface groups of the network device. The method further includes determining whether the source MAC address of the remote network device is stored within a source MAC address repository of the network device, and, in response to determining that the source MAC address is not stored within the source MAC address repository, storing an indication of the source MAC address, the first interface, and the first interface group in the source MAC address repository.

In another example, a network device includes a plurality of physical network interfaces for sending and receiving packets, a control unit, and a packet-forwarding engine. The control unit is configured to receive a layer two (L2) communication via a first interface of a set of interfaces of the network device, wherein the first interface is associated with one of the plurality of physical network interfaces, wherein the L2 communication includes a source media access control (MAC) address of a remote network device. The control unit includes an interface group information repository configured to store indications of the set of interface groups and the interfaces of the set of interface that belong to each interface group. The packet-forwarding engine includes a destination MAC address repository configured to store destination MAC address information, wherein the destination MAC address information includes an indication of a destination MAC address, an output interface, and an interface group to which the output interface belongs. The packet-forwarding engine also includes a MAC address management module configured to store the source MAC address, the first interface, and the first interface group in the destination MAC address repository in response to receiving the message from the packet-forwarding engine In another example, a computer-readable storage medium is encoded with instructions for causing one or more programmable processors receive an L2 communication via a second interface of the set of interfaces, wherein the L2 communication received via the second interface includes the source MAC address of the remote network device, and wherein the second interface belongs to a second interface group of set the of interface groups. The computer-readable storage medium is further encoded with instructions for causing the one or more programmable processors to determine whether the first interface group is the same as the second interface group, and store an indication of the source MAC address, the second interface, and the second interface group in the source MAC address repository in response to determining that the first interface group is the same as the second interface group.

In another example, a system includes a remote network device and a network device. The remote network device includes a set of physical network interface configured to send and receive layer two (L2) communications. The network device includes a plurality of physical network interfaces, a control unit, and a packet-forwarding engine. The control unit is configured to receive an L2 communication from the remote network device via a first interface of a set of interfaces of the network device, wherein the first interface is associated with one of the plurality of physical network interfaces, wherein the L2 communication includes a source media access control (MAC) address of a remote network device. The control unit includes an interface group information repository configured to store indications of the set of interface groups and the interfaces of the set of interface that belong to each interface group. The packet-forwarding engine is configured to process data received via the plurality of physical network interfaces. The packet forwarding engine includes a source MAC address repository configured to store source MAC address information, wherein the source MAC address information includes an indication of a source MAC address, an input interface, and an interface group to which the input interface belongs. The packet-forwarding engine also includes a MAC address management module configured to determine if the source MAC address of the remote network device is stored within the source MAC address repository, and store an indication of the source MAC address, the interface, and the interface group in the source MAC address repository in response to determining that the source MAC address is not stored in the source MAC address repository.

The techniques of this disclosure may provide one or more advantages. For example, the interface grouping techniques described herein allow for different MAC address learning mechanisms to be applied based, at least in part, upon the interface group to which each interface belongs. Applying different MAC address learning mechanisms based upon interface groups may reduce the amount of configuration and administration required to associate particular MAC addresses with particular interfaces. Furthermore, applying different MAC address learning mechanisms based upon interface groups may minimize the possibility of MAC address spoofing by, for example, disallowing MAC addresses from moving between interface groups until a certain condition is met. As another example, defining different interfaces within the same interface group may enable a multi-homed network device to quickly and easily switch between the various network paths without requiring administrator intervention and without waiting for a previous MAC address entry to age out.

The details of one or more embodiments of the techniques of this disclosure are set forth in the accompanying drawings and the description below. Other features, objects, and advantages will be apparent from the description and drawings, and from the claims.

DETAILED DESCRIPTION

Figure 1:
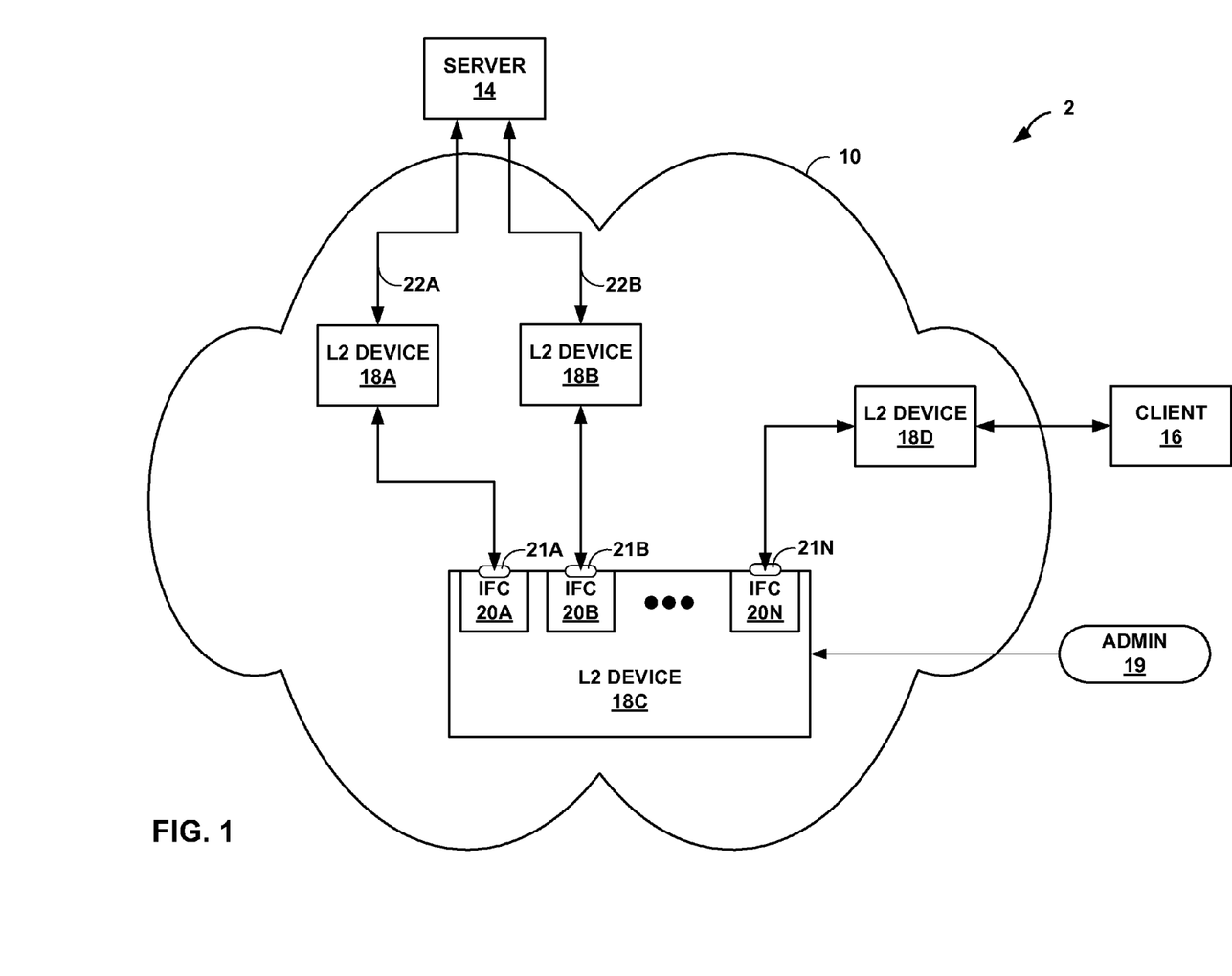
FIG. 1 is a block diagram illustrating an example network system that implements the techniques described in this disclosure.

FIG. 1 is a block diagram illustrating an example network environment 2 in which a set of layer two (L2) network devices 18A-18D (collectively, "L2 devices 18") provide L2 services within network 10. For example, L2 devices 18 may be a collection of Ethernet switches or bridges that transparently operate as an Ethernet network to provide L2 connectivity between server 14 and client 16. Server 14 represents any device that provides one or more network resources accessible to client 16. For example, server 14 may include email servers, domain controllers, web servers, print servers, printers, network copiers, gateways, intelligent switches, hubs, routers or other network access points or devices. Examples of client 16 include a personal computer, a laptop computer, a network telephone, a television set-top box, a video game system, a point-of-sale device, an intermediate network device, a network appliance, or any other type of device capable of interfacing with and communicating over network 10. In addition, client 16 may each be a gateway, router, switch, or other device for coupling a customer network to network 10.

As illustrated in FIG. 1, server 14 is connected to L2 devices 18A, 18B via network links 22A and 22B (collectively, "network links 22"). Examples of network links 22 include a physical connection such as a copper wire, a coaxial cable, any of a host of different fiber optic lines or a wireless connection, or a virtual or logical connection defined by server 14 and mapped to physical links. In some examples, server 14 actively directs network traffic over both network links 22A and 22B. In other examples, server 14 selects one of network links 22, e.g., network link 22A, as an active network link over which server 14 sends network traffic and selects other network links 22, e.g., network link 22B, as backup network links over which server 14 sends network traffic if the active network link becomes unavailable.

Each of L2 devices 18 may comprise L2 switches or another type of network device that facilitates the transfer of data within network system 2. In some examples, L2 devices 18 also perform bridging functions, firewall functions, intrusion detection functions, or other network functions. Further, although shown and described as providing L2 services, each of L2 devices 18 may be any network element that provides services for other layers of the network stack. As one example, L2 devices 18 may be network routers that integrate L2 and layer 3 (L3) services so as to provide L3 routing functions as well as L2 forwarding services.

Although described, with respect to Ethernet, L2 devices 18 may apply the techniques described herein to other forms of L2 communications.

As illustrated in FIG. 1, L2 device 18C includes network interfaces cards ("IFCs") 20A-20N (collectively, "IFCs 20") for sending and receiving network communications, e.g., L2 frames. IFCs 20 typically have one or more physical interfaces, sometimes referred to as ports (not shown in FIG. 1), for coupling to network links. In accordance with the techniques of this disclosure, L2 device 18C controls MAC address learning based on interface groups to which the interfaces are assigned. For example, administrator 19 ("admin 19") initially configures L2 device 18C to create various interface groups based on the topology of network 2 and the administrative goals with respect to controlling relearning of MAC addresses. Administrator 19 then assigns the physical interfaces of IFCs 20 to the interface groups. The interfaces of IFCs 20 may be assigned to any number of different interface groups where each interface group includes any combination of one or more of interfaces that and may include interfaces from one or more of IFCs 20. Each interface is typically assigned to a single interface group, and the interfaces of any given IFC 20 may be assigned to the same or different interface groups. For purposes of clarity and simplicity, the techniques of this disclosure will be described will be described with respect to the example shown in FIG. 1 as if each IFC 20 includes a single interface.

In the example shown in FIG. 1, server 14 is multi-homed to network 10 by two different switches, i.e., L2 devices 18A and 18B. In this example, server 14 may transmit network data to client 16 via two different network paths. The first network path includes network link 22A, L2 device 18A, IFCs 20A and 20N of L2 device 18C, and L2 device 18D. The second network path includes network link 22B, L2 device 18B, IFCs 20B and 20N of L2 device 18C, and L2 device 18D. In one example, the first network path is an active network path and the second network path is a backup network path that server 14 may use if the first network path becomes unavailable or less desirable due to a network fault or network traffic congestion, for example. When server 14 first connects to network 10 and sends network data to client 16 via the first network path, L2 device 18C learns the specific interface by which server 14 is reachable, i.e., interface 21A of IFC 20A, and stores an entry in a MAC address repository of L2 device 18C (not show) that associates the MAC address of server 14 with interface 21A of IFC 20A.

If server 14 stops transmitting network data over the first network path and begins transmitting network data over the backup network path, L2 device 18C may re-learn the interface on which server 14 is reachable, i.e., interface 21B of IFC 20B. For example, interfaces 21A and 21B may belong to the same interface group. In this case, L2 device 18C examines the source MAC address specified in the header information of the L2 frame received from server 14 via the interface of IFC 20B and determines that the L2 frame includes the same source MAC address as was previously learned on interface 21A. Because in this example interfaces 21A and 21B belong to the same interface group, L2 device 18C allows the MAC address of server 14 to be dynamically re-learned as being reachable via interface 21B. This may involve removing the entry from a MAC table of IFC 20A and updating a MAC table of IFC 20B to associate the MAC address of server 14 with interface 21B.

In another example, interfaces 21A, 21B of IFCs 20A, 20B may be assigned to different interface groups by admin 19. In some examples, network device 18C applies different MAC address learning techniques based upon which interface group to which the interface of IFC 20A belongs. For example, interface 21A is assigned to a first interface group and interface 21B is assigned to a second, different interface group, L2 device 18C pins the MAC address of server 14 to the interface of IFC 20A. That is, L2 device 18C prohibits dynamic re-learning thereby preventing the MAC address of server 14 from being associated with interface 21B. In some examples, L2 device 18C may allow the MAC address of server 14 to be associated with interface 21B in the event the previous association with interface 21A has expired or otherwise been removed be admin 19.

In one example embodiment, L2 device 18C provides a default interface group for which re-learning techniques are applied differently than other groups. That is, unlike other interface groups, MAC addresses initially learned on interfaces assigned to the default interface group are allowed to be dynamically relearned on interfaces assigned to other interface groups. Once relearned on an interface of a different interface group, the MAC addresses are pinned to interfaces within that interface group. For example, if interface 21A is assigned to a default interface group and interface 21B is assigned to a different interface group, L2 device 18C allows the MAC address of server 14 to be dynamically re-learned. That is, L2 device 18C removes the MAC address of server 14 from the MAC table of interface 21A and associates the MAC address with interface 21B by inserting the MAC address into the MAC table of interface 21B.

In this manner, L2 devices may apply different MAC address learning mechanisms when a MAC address is first seen, when the MAC address is subsequently seen on a different interface belonging to the same interface group as the first interface, and when the MAC address is subsequently seen on an interface belonging to a different interface group than that of the first interface. By utilizing these techniques, a network provider may simplify the configuration and administration associated with moving devices between interfaces of an L2 device while minimizing the possibility of MAC address spoofing by a third party. For example, the techniques of this disclosure may permit a multi-homed network device to quickly and easily switchover to a backup network connection by enabling an L2 device to apply dynamic MAC address learning mechanisms for the interfaces involved in the multi-homing. However, by excluding other interfaces from the interface group, the administrator may configure the L2 device to reduce any risk that the address may be spoofed by a malicious third-party on a different interface.

Figure 2:
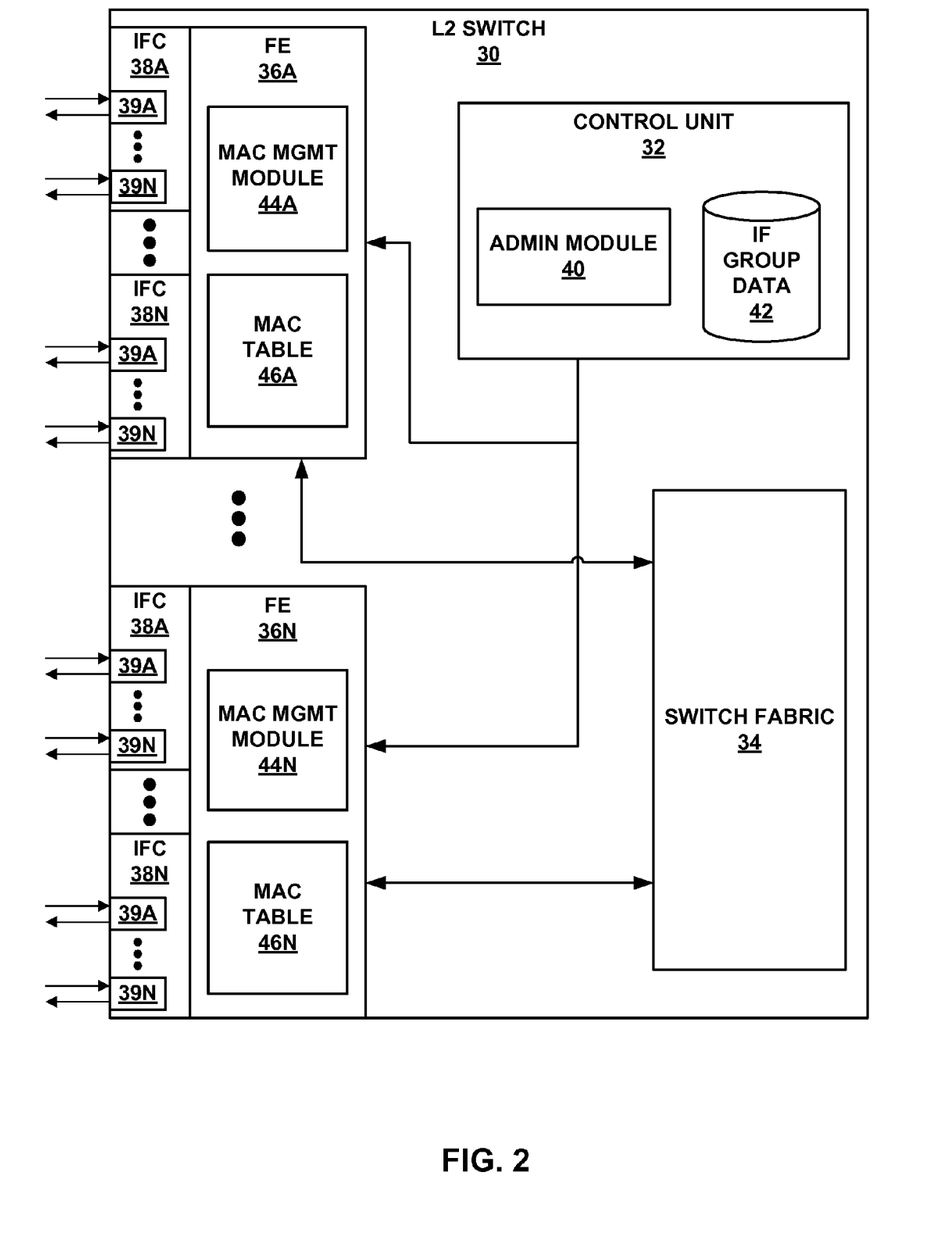
FIG. 2 is a block diagram illustrating an example layer two (L2) network switch that implements the techniques described in this disclosure.

FIG. 2 is a block diagram illustrating an example L2 switch 30 that operates in accordance with the techniques of this disclosure. For purposes of illustration, L2 switch 30 may be described below within the context of the example network 10 of FIG. 1 and may represent L2 device 18C. In this example embodiment, L2 switch 30 includes control unit 32 that provides control plane functionality for the L2 switch. L2 switch 30 also includes switch fabric 34 interconnecting a set of forwarding elements 36A-36N (collectively, "FEs 36") that send and receive traffic by a set of network interface cards 38A-38N (collectively, "IFCs 38") that include interfaces 39A-39N (collectively, "interfaces 39"). The letter "N" is used herein to represent an arbitrary number of devices. Switch fabric 34 and FEs 36 collectively provide a data plane for forwarding network traffic, such as L2 frames. Although not shown in FIG. 2, FEs 36 may each comprise a central processing unit (CPU), memory, and one or more programmable packet-forwarding application-specific integrated circuits (ASICs). Switch fabric 34 provides a high-speed interconnect for forwarding incoming data between FEs 36 for transmission over a network.

Control unit 32 provides control plane functions for L2 switch 30. For example, control unit 32 provides an operating environment for executing administration module ("ADMIN MODULE") 40 and storing interface group data ("IF GROUP DATA") 42. Control unit 32 may include one or more microprocessors (not shown in FIG. 2) that execute software instructions, such as those used to define a software or computer program, stored on a tangible computer-readable storage medium (not shown in FIG. 2). Examples of computer-readable storage media include a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control unit 32 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Administration module 40 presents a user interface with which an administrator (e.g., admin 19) interacts to configure L2 switch 30. In some examples, the administrator enters commands to create, remove, modify, or otherwise configure interface groups stored in interface group data 42. Each interface group may include any number of interfaces 39 associated with any IFCs 38 and FEs 36. For example, the administrator may configure L2 switch 30 such that each interface 39 automatically belongs to a default interface group, e.g., to simplify the initial configuration of L2 switch 30. The administrator may then assign a different interface group to any of interfaces 39 via administration module 40.

FEs 36A-36N include MAC address management modules ("MAC MGMT MODULE") 44A-44N (collectively, "MAC address management modules 44"), MAC address tables 46A-46N (collectively, "MAC address tables 46"). MAC address management modules 44 are configured to manage the storage and retrieval of entries in MAC tables 46. In some examples, MAC address management modules 44 provide functionality to enable L2 switch 30 to control MAC address learning in accordance with the user-defined interface groups as described in this disclosure. That is, MAC address management modules 44 enforce various MAC address learning techniques based, at least in part, on the interface group information stored in interface group data 42, a copy of which control unit 32 may distribute or otherwise install within FEs 36. In some examples, MAC address management modules 44 are configured to prevent a MAC address first seen on one interface and subsequently seen on a different interface from dynamically being associated with the second interface unless the second interface is assigned to the same group as the first interface, for example. Configuration data specifying the interface groups and the interfaces assigned thereto is stored in interface group data 42 as further described with respect to FIG. 5.

Each of FEs 36 is configured to send and receive L2 data, store MAC address information in MAC address table 46 for the set of IFCs 38 and interfaces 39 associated with each FE 36. While described as a table, MAC address table 46 may be stored in individual data structures or together in one data structure and may be stored in the form of one or more tables, databases, linked lists, radix trees, or other suitable data structure. MAC address table 46 is further described with respect to FIG. 3.

In general, each FE 36 processes L2 traffic received on a subset of the interfaces installed in the L2 switch 30. As illustrated in FIG. 2, each FE 36 processes data for a set of IFCs 38A-38N and the set of interfaces 39A-39N for each IFC 38. The letter "N" is used herein to represent an arbitrary number of devices and, while the letter N is used to indicate the number of IFCs 38 in each set of IFCs 38 for which each FE 36 processes data and the number of interfaces 39 in each set of interfaces for each IFC 38, the number of IFCs 38 and interfaces 39 in each set may be different.

In one example, L2 switch 30 receives an L2 frame via interface 39A of IFC 38A associated with FE 36A. FE 36A inspects the header information of the L2 frame to determine a source and a destination MAC address of the L2 frame. MAC address management module 44A then performs a lookup in MAC address table 46A based on the source MAC address of the L2 frame. If no matching entry is found for the source MAC address in the MAC address table 46A, MAC address management module 44A determines that L2 switch 30 has not previously received an L2 frame from the source MAC address.

MAC address management module 44A then retrieves interface group information for interface 39A. In some examples, MAC address management modules 44 are configured to retrieve interface group information from interface group data 42. In other examples, MAC address management modules 44 are configure to maintain a local copy of the information contained within interface group data 42 within FE 36A (not shown). MAC address management module 44A then creates an entry in MAC address table 46A. In some examples, the entry includes the source MAC address specified in the header information of the L2 frame, an indication of the particular interface 39 on which the packet was received, the group to which the particular interface 39 belongs, and an indication as to whether the entry is configured to age out. In other examples, the interface group information is not stored within MAC address table 46A. Instead, the interface group information is only maintained in interface group data 42. If the entry is not configured to age out, an administrator is required to remove the entry. FE 36A then forwards a copy of the L2 frame to all of the interfaces 39 for all of the sets of IFCs 38 and FEs 36 except for the particular interface 39 on which the L2 frame was received.

In general, when a particular one of FEs 36 receives an L2 frame and first learns a MAC address of a remote network device, the particular FE 36 sends a message to the other FEs 36 to cause the recipient FEs 36 to store the newly learned MAC addresses in the MAC address table 46 of each recipient FE 36. One example message is a multilink procedure packet. In accordance with the techniques of this disclose, the message sent to the other FEs 36 includes the newly learned MAC address, an indication of the interface on which the remote network device is reachable, and the interface group to which the specified interface belongs. Each recipient FE 36 then stores the MAC address, the interface, and the interface group identifier in the MAC address table 46.

In another example, L2 switch 30 receives an L2 frame via interface 39N of IFC 38N of FE 36N. MAC address management module 44N performs a lookup in MAC address table 46N based on the source MAC address specified in the header information of the L2 frame, which, in this example, which returns a matching entry. In some examples, the matching entry retrieved from the MAC address table 46N indicates that an L2 frame having the same source MAC address was previously received by L2 switch 30 via interface 39A of IFC 38A of FE 36A and includes group information for interface 39A. MAC address management module 44N then retrieves the interface group information for interface 39N of IFC 38N of FE 36N from interface group data 42. In other examples, where the interface group information is not stored in MAC address table 46N, MAC address management module 44N retrieves the interface group information for both interface 39A of IFC 38A of FE 36A and interface 39N of IFC 38N of FE 36N. Upon retrieving the relevant interface group information, MAC address management module 44 compares the interface group information for interface 39N to the interface group information for interface 39A. The manner in which MAC address management module 44N processes the L2 frame depends, at least in part, upon the interface group membership of interfaces 39A and 39N.

For example, if the matching entry indicates that interface 39A belongs to the same interface group as interface 39N, MAC address management module 44N is configured to allow the source MAC address to be dynamically re-learned. That is, MAC address management module 44N removes the previous entry in the MAC address table 46N, adds a new entry in the MAC address table 46N that associates the source MAC address with interface 39A and sends a message to the other FEs 36 indicating that the source MAC address is now reachable via interface 39N of IFC 38N of FE 36N.

In another example, the matching entry indicates that interface 39A belongs to an interface group other than the default interface group and the retrieved group information for interface 39N indicates that interface 39N belongs to a different interface group from interface 39A. In this example, MAC address management module 44N is configured to prevent the source MAC address from being re-learned as being reachable via interface 39N of IFC 38N of FE 36N and FE 36N drops the L2 frame. That is, MAC address management module 44N pins the source MAC address to the interface group to which interface 39A belongs and FE 36N does not forward the L2 frame.

In another example, if the matching entry indicates that interface 39A belongs to a default interface group and the retrieved interface group information for interface 39N indicates that interface 39N belongs to a different interface group. In this example, MAC address management module 44N is configured to allow the source MAC address to be re-learned as being reachable via interface 39N of IFC 38N of FE 36N. That is, MAC address management module 44N removes the previous entry in the MAC address table 46N, adds a new entry in the MAC address table 46N and sends a message to the other FEs 36 indicating that the source MAC address is now reachable via interface 39N of IFC 38N of FE 36N.

Figure 3:
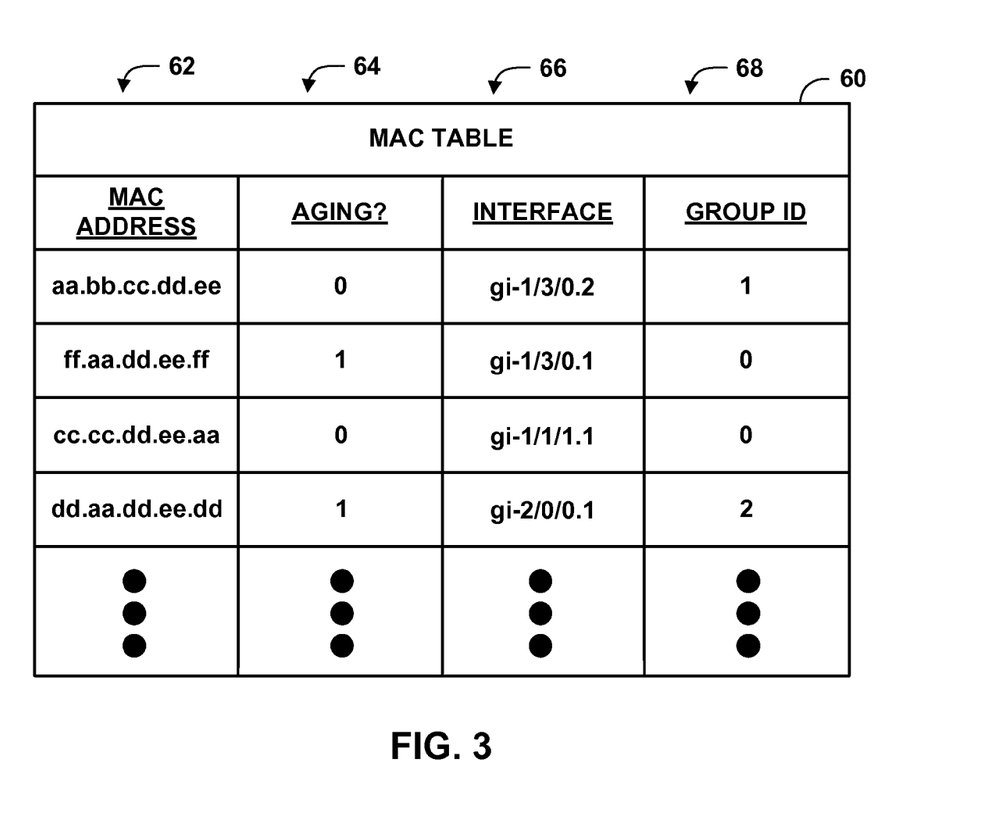
FIG. 3 is a block diagram illustrating an example MAC address table consistent with the techniques described in this disclosure.

FIG. 3 is a conceptual diagram illustrating an example MAC address table 60 that may be used during a lookup process when L2 switch 30 receives a packet from a remote network device, e.g., server 14 of FIG. 1. For example, MAC address table 60 may be an example of a MAC address table 46 of FIG. 2. MAC address table 60 includes a MAC address column 62, an aging column 64, an input interface column 66, and, optionally, a group identifier (ID) column 68. As discussed above, each of FEs 36 includes a MAC address table 46 and stores MAC addresses and interface information in MAC address table 46. FEs 36 also use information from MAC address table 46 to determine if a MAC address and interface pair is already stored in MAC address table 46.

MAC address table 60 includes four example entries, represented as rows. The first row of MAC address table 60 includes MAC address "aa.bb.cc.dd.ee", aging "0", interface "gi-1/3/0.2", and group ID "1". In the example of FIG. 3, an aging column value of zero corresponds to an entry that does not age out, e.g., a static entry that does not change unless modified by an administrator. An input interface defined with a prefix "gi" corresponds to a general interface, such as one of interfaces 39, and a group ID value of one indicates that the input interface belongs to a first interface group that is not the default interface group. When one of FEs 36 inspects a received L2 frame and extracts the source MAC address from the header information of the received L2 frame, the FE 36 perform a lookup in MAC address table 60 based on the source MAC address. If the source MAC address matches a MAC address entry in the MAC address column 62, the information stored in aging column 64, interface column 66, and group ID column 68 corresponding to the matched MAC address is returned to the FE 36 for further processing.

The second row of MAC address table 60 includes MAC address "ff.aa.dd.ee.ff", aging "1", interface "gi-1/3/0.1", and group ID "0". An aging column value of one corresponds to an entry that ages out after a configurable period of time. As an example, an entry ages out if a packet having the MAC address is not received via the interface indicated in the corresponding row of the MAC address table 60 within five minutes after the last packet having the source MAC address was received via the same interface. Each time a packet having the source MAC address is receive via the same interface, the configurable period of time resets to the maximum permitted time and restarts counting down. If the configurable period of time expires, the FE 36 in which the MAC address table 60 resides removes the entry from MAC address table 60. A group ID column value of 0 indicates that the input interface belongs to a first interface group, i.e., a default interface group.

An example of how a FE 36, e.g., FE 36A of FIG. 2, may use the information stored in MAC address table 60 follows. FE 36A receives an L2 frame via interface "gi-1/3/0.1" and the L2 frame includes a header that indicates a source MAC address of "aa.bb.cc.dd.ee". In this example, MAC address management module 44A of FE 36A performs a lookup in MAC address table 60 using the MAC address "aa.bb.cc.dd.ee", which matches the MAC address stored in the first row. The values for the aging column 64 ("0"), interface column 66 ("gi-1/3/0.2"), and group ID column 68 ("1") are returned by the lookup. MAC address management module 44A then compares the interface on which the packet was received, "gi-1/3/0.1", to the value of the corresponding entry in the interface column 66, "gi-1/3/0.2". In this example, the interface on which the packet was received is different from the stored interface associated with the same source MAC address. MAC address management module 44A then retrieves the group ID information for the interface on which the packet was received from the interface group data repository, e.g., interface group data 42 of FIG. 2, which, in this example, is "0". The previously received L2 frame was received via interface "gi-1/3/0.2" that belongs to interface group "1", which identifies a second interface group different than the first interface group. In accordance with the interface group pinning techniques describe in this disclosure, MAC address management module 44A is configured to prevent the source MAC address from being associated with a different interface unless the different interface belongs to the same interface group as the previous interface or the default group. That is, MAC address management module 44A is configured to pin a MAC address to a particular interface group. Therefore, because the previously received L2 frame was received via an interface that does not belong to the same interface group as the interface on which the subsequent L2 frame was received, MAC address management module 44A does not update the MAC address and interface information stored in MAC address table 60 and FE 36A drops the L2 frame.

In another example, one of FEs 36 receives an L2 frame via an interface, i.e. "gi-1/3/0.2". The L2 frame includes a header that indicates a source MAC address of "ff.aa.dd.ee.ff". In this example, the MAC address management module 44 of FE 36 performs a lookup in MAC address table 60 using the MAC address "ff.aa.dd.ee.ff", which matches the MAC address stored in the second row. The values for the aging column 64, interface column 66, and group ID column 68 are returned by the lookup. The MAC address management module 44 then compares the interface on which the packet was received, "gi-1/3/0.2" to the value of the corresponding entry in the interface column 66, "gi-1/3/0.1". In this example, the interface on which the packet was received does not correspond to the stored interface associated with the same MAC address.

The MAC address management module 44 then retrieves the group ID information for the interface on which the packet was received from the interface group data repository, e.g., interface group data 42 of FIG. 2. In one example, the group ID is "1". Because the interface group of the previously stored interface (group ID "0") indicates that the previously stored interface belongs to the default interface group, MAC address module 44A is configured to allow the MAC address to be re-learned as being associated with the "gi-1/3/0.2" interface. That is, MAC address management module removes the previously stored entry in MAC address table 60, stores the source MAC address and interface information in the MAC address table 60, and sends messages to the other FEs 36 to notify the other FEs 36 of the new association.

In another example, the group ID of the interface on which the L2 frame was received is "1". In this example, the previously stored interface and the interface on which the L2 frame was received belong to the same interface group because the group ID of both interfaces is the same. Because both interfaces belong to the same interface group, the MAC address management module 44 re-learns the source MAC address as being associated with the interface on which the L2 frame was received. That is, MAC address management module stores the source MAC address and interface information in the MAC address table 60 and sends messages to the other FEs 36. The message causes the other FEs 36 to remove any entry that may exist for the MAC address in the MAC address table 60 of each FE 36 and add an entry for the MAC address and interface in the MAC address table 60 of each FE.

While the examples above describe MAC table 60 as including interface group information, other examples may operate in a substantially similar manner where the interface group information is not stored in MAC table 60. In these examples, MAC address management module 44 performs retrieves all interface group information from the interface group information repository, e.g., interface group data 42. MAC address management module 44 retrieves the interface group information from interface group data 42 by performing one or more lookups based on the interface on which the packet was received and the interface retrieved from MAC table 60 corresponding to the source MAC address specified in the header of the L2 frame being processed by the L2 switch 30. Storing the interface group information in interface group data 42, but not in MAC table 60 may provide one or more advantages, such as reduced memory requirements, because, while interface group data 42 typically includes one entry per interface, MAC table 60 may include hundreds of entries or more per interface.

Figure 4:
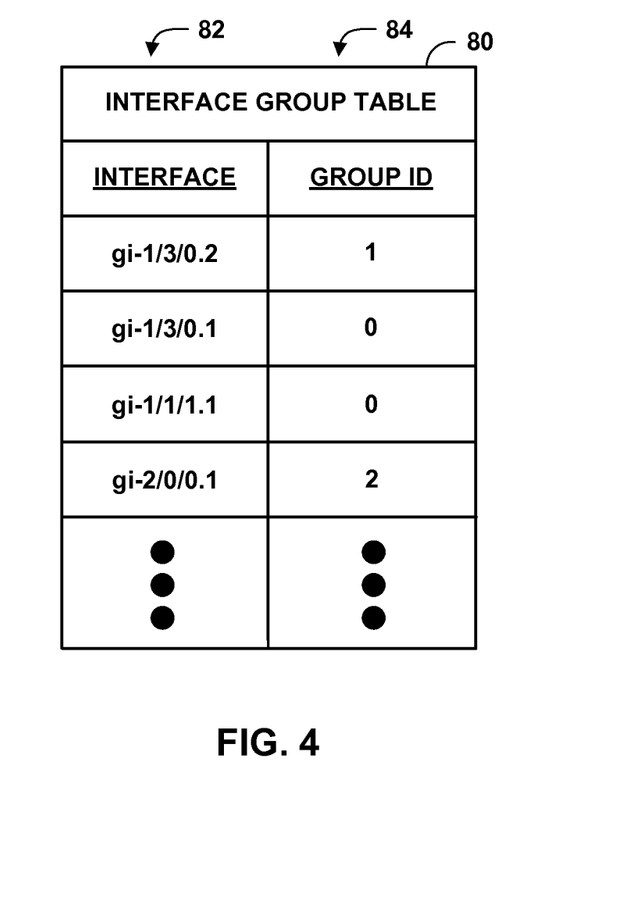
FIG. 4 is a block diagram illustrating an example interface group table consistent with the techniques described in this disclosure.

FIG. 4 is a conceptual diagram illustrating an example interface group table 80 that may be used during a lookup process when L2 switch 30 receives an L2 frame from a remote network device, e.g., server 14 of FIG. 1. For example, interface group table 70 may be an example of interface group data 42 of FIG. 2. Interface group table 80 includes an interface column 82 and a group identifier (ID) column 84. As discussed above, in some examples, MAC address management modules 44 perform lookups in interface group table 80 to determine group membership for a particular interface.

Interface group table 80 includes four example entries, represented as rows. The first row of interface group table 80 includes interface "gi-1/3/0.2" and group ID "1". In the example of FIG. 4, a interface with a prefix "gi" corresponds to a general interface, such as one of interfaces 39 and a group ID value of one indicates that the input interface belongs to a first interface group that is not the default interface group.

In some examples, an administrator interacts with an administration module, such as administration module 40 of FIG. 2, to configure the entries in interface group table 80. In one example, the administrator configures L2 switch 30 to define any new interfaces within a default group. In this example, when the administrator adds an interface card, such as one of IFCs 38, control unit 32 creates an entry corresponding to each new interface 39 of IFC 38 within interface group table 80 having a group ID corresponding to the default group, i.e., having a group ID of "0". The administrator may change the group membership for the interfaces by interacting with administration module 40 to cause administration module 40 to issue commands that modify the entries in interface group table 80. In the example of FIG. 4, an administrator configured interface "gi-1/3/0.2" to belong to the interface group having the group ID "1" and configured interface "gi-2/0/0.1" to belong to the group having the group ID "2".

Figure 5:
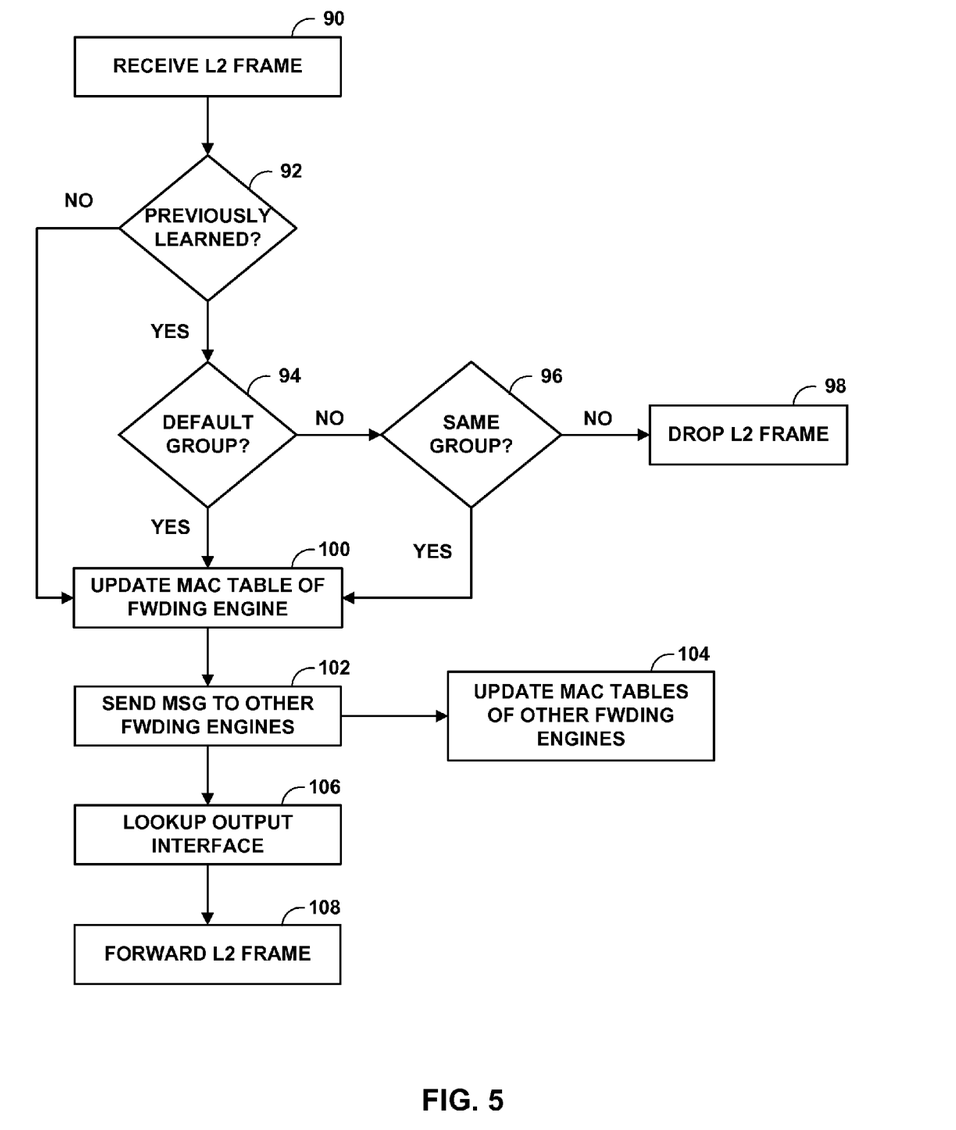
FIG. 5 is a flow chart illustrating an example operation of a network device operating in accordance with the techniques described in this disclosure.

The syntax used in the example illustrated in FIGS. 4 and 5 is merely one example. L2 switch 30, control unit 32, and FEs 36 may be configured to use any syntax.

FIG. 5 is a flow chart illustrating an example operation of a layer two (L2) network device configured to manage Media Access Control (MAC) addresses in a manner consistent with the techniques described in this disclosure. For purposes of clarity, the method shown in FIG. 5 will be described with respect to L2 switch 30 shown in FIG. 2. L2 switch 30 receives an L2 frame from a remote network device (90) via a particular input interface, e.g., interface 39A of IFC 38A of FE 36A. FE 36A inspects the L2 frame, extracts the source MAC address indicated by the header information of the L2 frame and determines if source MAC address was previously learned as being reachable via some interface 39 of L2 switch 30 (92). MAC address management module 44A performs a lookup in MAC address table 46A using the source MAC address. If the lookup does not return a matching entry, MAC address management module 44A determines that the source MAC address was not previously learned ("NO" branch of 92) and the method proceeds to step 100.

If the lookup in the MAC address table 46A returns a matching entry, MAC address management module 44A determines that the source MAC address was previously learned ("YES" branch of 92). In this case, MAC address management module 44A applies the techniques described herein to determine whether to allow dynamic relearning of the MAC address, i.e., reassign to a different interface. For example, the returned matching entry includes an indication of the interface from which the source MAC address was previously learned and an indication of the interface group to which the specified interface is assigned. Next, MAC address management module 44A determines if the interface group included in the matching entry is the default interface group (94). L2 switch 30 may be configured to interpret any particular value to indicate the default interface group. In one example, the value "0" indicates the default interface group and other values, i.e., the value "1" or the value "2", indicate different interface groups that are not the default interface group. In this example, if the interface group returned by the lookup is the value "0", MAC address management module 44A engine determines that the input interface with which the MAC address is currently associated belongs to the default interface group ("YES" branch of 94). In this case, MAC address management module 44A allows dynamic relearning interface by which the MAC address is reachable by updating source MAC address table 46A (100) and outputting an internal message to the other FEs to direct the other FEs to similarly update their MAC tables (102, 104).

If, however, the interface group returned by the lookup is a value other than the value "0", MAC address management module 44A determines that the previously stored input interface does not belong to the default interface group ("NO" branch of 94) and determines whether the interface group of the interface on which the packet was received is the same as the previously stored interface group (96). In particular, MAC address management module 44A retrieves interface group information for the interface on which the packet was received from interface group data 42 and compares the interface group to the interface group for the interface currently associated with the MAC address. If the interface groups are not the same ("NO" branch of 96), FE 36A drops the L2 frame (98) and optionally outputs an alert or updates one or more counters or logs with respect to the potentially malicious traffic.

If the interface groups are the same ("YES" branch of 96), MAC address management module 44A allows dynamic relearning interface by which the MAC address is reachable by updating MAC address table 46A (100). MAC address management module 44A may updates the MAC address tables by storing an indication of the source MAC address, the input interface, and the interface group to which the input interface belongs in MAC address table 46A. Next, FE 36A sends a message internal to L2 device 30 to the other FEs 36 (102). The message may be any message that causes the other FEs 36 to update their respective MAC address tables. The message includes an indication of the source MAC address of the L2 frame, the interface on which the packet was received, and the interface group to which the interface belongs.

The other FEs 36 receive the message and update their source and destination MAC address tables accordingly (104). If the MAC address table 46 of each of the other FEs 36 previously included an entry corresponding to the source MAC address, the FEs 36 remove the entry from the FE's 36 respective MAC address table 46. The other FEs 36 then add a new entry to each FE's 36 respective MAC address table 46 that includes the source MAC address, the output interface that corresponds to the input interface on which the packet was received, and the interface group to which the output interface belongs. In general, the output interface that corresponds to the input interface belongs to the same interface group as the input interface.

After sending the internal message to the other FEs 36, FE 36A performs a lookup in MAC address table 60 based on the destination MAC address specified in the header information of the L2 frame (106). If the lookup returns a matching entry, the matching entry includes the interface on which the packet is to be forwarded, i.e., the output interface on which the destination MAC address is reachable. FE 36A then forwards the L2 frame to the appropriate output interface and the L2 frame is sent to the next (108). If the lookup does not return a matching entry, FE 36A sends a copy of the L2 frame to all of the interfaces of L2 switch 30 (108). In this manner, FE 36A forwards an L2 frame to the destination MAC address specified in the header information of the L2 frame.

Figure 6:
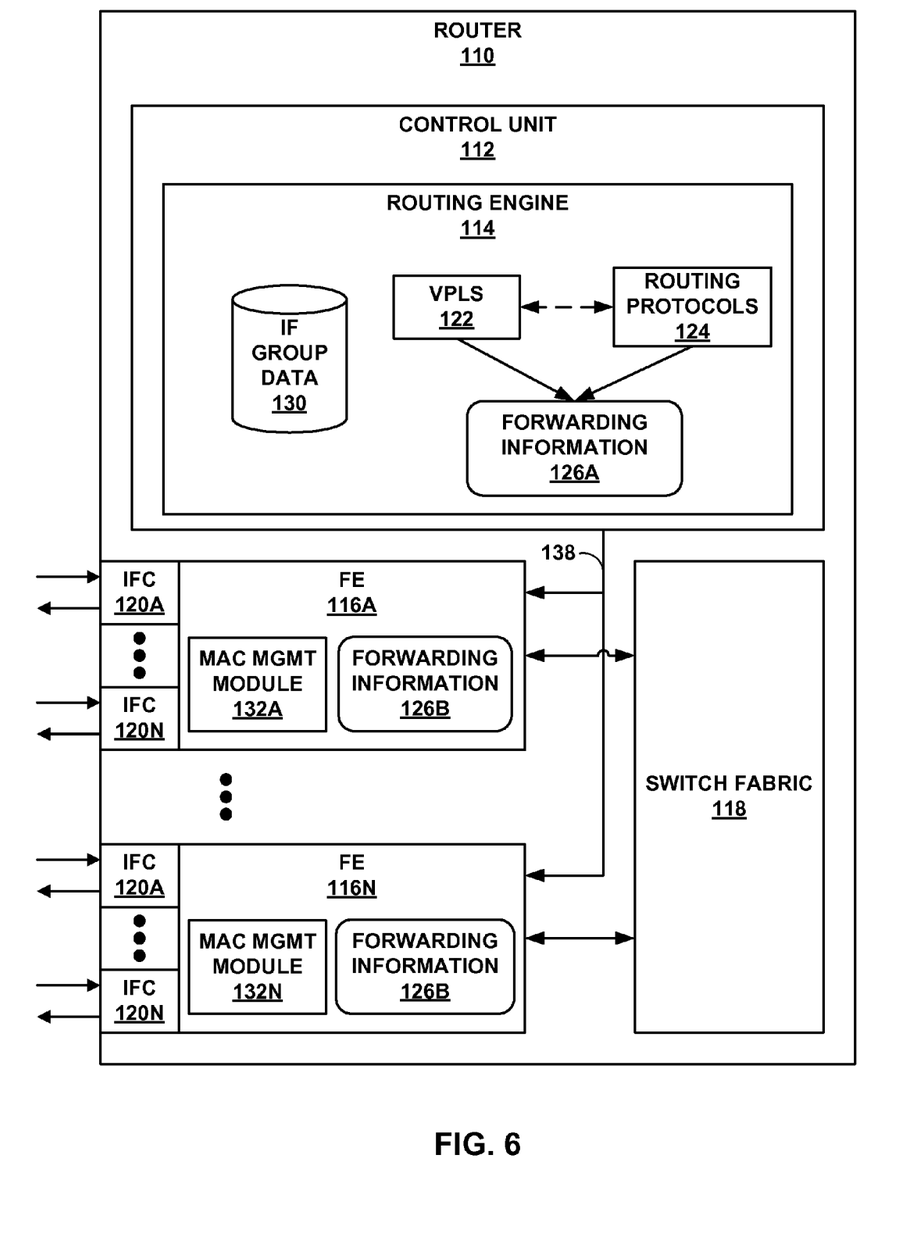
FIG. 6 is a block diagram illustrating an example router that integrates L2 and layer three (L3) services so as to provide L3 routing functions as well as L2 forwarding services.

FIG. 6 is a block diagram illustrating an example router 110 that integrates L2 and layer three (L3) services so as to provide L3 routing functions as well as L2 forwarding services. Router 110 may be used, for example, in a L3 network used as an intermediate transport network between two or more L2 networks in order to allow communication between the L2 networks. In this type of configuration, router 110 and other routers of the L3 network transparently transports L2 communications between the L2 networks, thereby allowing the L2 networks to share an L2 service. Common protocols for transporting the L2 communications through the intermediate L3 network are label switching protocols, such as Multi-protocol Label Switching (MPLS) protocols, Resource Reservation Protocol (RSVP) and the Label Distribution Protocol (LDP). A source device, such as a router connected to one of the L2 networks, can request a path through the intermediate network. For example, with MPLS, this path is referred to as a Label Switched Path (LSP), and defines a distinct, dedicated, and guaranteed path through the network to carry MPLS packets from the source to the destination. The MPLS packets encapsulate the L2 communications, thereby effectively shielding the L3 network from the transported L2 information.

In one example, router 110 executes the Virtual Private LAN Service (VPLS), also referred to as Point-to-multipoint (P2MP) L2 Virtual Private Networks (VPNs). In general, VPLS allows two or more remote customer networks to be transparently connected through the intermediate network as if the intermediate network does not exist from the perspectives of the customer networks. In particular, L2 communications, such as Ethernet packets, are transported between customer networks via the intermediate network. In a typical configuration, router 110 and other VPLS-enabled routers that are associated with the customer networks define LSPs within the intermediate network to carry encapsulated L2 communications as if these customer networks were directly attached to the same Local Area Network (LAN). To properly communicate via these LSPs, router 110 and the other VPLS-enabled routers stores L2 information, such as MAC addresses, as well as VPLS information, such as local and remote VPLS site information. In this manner, these VPLS-enabled routers provide transparent L2 connectivity across the intermediate network and simulate a direct LAN.

In the example illustrated in FIG. 7, router 110 is a VPLS-enabled L3/L2 device that includes a control unit 112 having a routing engine 114. Router 110 also includes a plurality of forwarding elements (FEs) 116A-116N ("FEs 116") and a switch fabric 118. FEs 116 may each receive and send data packets via interface cards 120A-120N ("IFCs 120"). In other examples, each of FEs 116 may comprise more or fewer IFCs 120 and even though FIG. 7 may suggest that each of FEs 116 comprise the same number of IFCs 120, each FE 116 may comprise a different number of IFCs 120. Switch fabric 118 forwards incoming data packets to the correct one of FEs 116 for transmission over a network, such as network 10 of FIG. 1.

Generally, routing engine 114 maintains routing tables, executes routing protocols and controls user access to routing engine 114. Routing engine 114, as shown in FIG. 7, includes a plurality of executable software modules, VPLS module 122 ("VPLS 122") and routing protocols module 124 ("protocols 124"). VPLS module 122 represents software that implements the VPLS protocol described above that routine engine 114 executes to support VPLS 122. Routing protocols 124 represents various routing protocols and/or signaling protocols, such as a label distribution protocol (LDP), Open Shortest Path First (OSPF), Intermediate system to intermediate system (IS-IS), or the border gateway protocol (BGP), that routing engine 114 may execute to determine the current topology of network 10 and/or signal paths within the current topology respectively. VPLS 122 or any of protocols 124 may, after determining the network topology, resolve the network topology into forwarding information 126A. Forwarding information 126A includes information about which remote network devices are reachable via which interfaces, i.e., logical interfaces, configured on router 110.

In some examples, routing engine 114 loads a copy of or a subset of forwarding information 126A into to each of FEs 116 via a dedicated link 138. The loading of forwarding information 126A is represented in FIG. 7 by forwarding information 126B included within each of FEs 116. The loading may not necessarily proceed by completely replacing any prior forwarding information 126B with newly resolved forwarding information 126A, but instead may involve routing engine 114 outputting a series of update messages to update forwarding information 126B within FEs 116 to reflect any changes between previous and recently resolved forwarding information 126A, 126B respectively. Thus, forwarding information 126B may be either "loaded" or "updated" within FEs 116, and each term may be used herein interchangeably.

FEs 116 also include MAC address management modules ("MAC MGMT MODULES") 132A-132N (collectively, "MAC address management modules 132"). MAC address management modules 132 provide functionality that enables router 110 to implement interface groups as described in this disclosure. That is, MAC address management modules 132 apply various MAC address management techniques based, at least in part, on the interface group information stored in interface group data ("IF GROUP DATA") 130 in a manner similar to the manner previously described with respect to L2 switch 30 and MAC address management modules 44 of FIG. 2.

The architecture of router 110 illustrated in FIG. 7 is shown for exemplary purposes only. The disclosure is not limited to this architecture. In other embodiments, router 110 may be configured in a variety of ways. In one embodiment, for example, some of the functionally of routing engine 114 and packet forwarding engine 116 may be distributed within IFCs 120.

In this manner, network devices manage MAC address learning based, at least in part, on interface group membership. Extending the functionality of L2 switch 30 to include interface groups reduces administration and configuration associated with configuring L2 switch 30 while also minimizing the possibility of a MAC address being spoofed, causing network traffic to be forwarded to an incorrect network device.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various embodiments of the invention have been described. These and other embodiments are within the scope of the following claims.

The invention claimed is:

1. A method comprising:
storing, with a network device having a plurality of interfaces, data defining an interface group comprising a subset of the interfaces, wherein the subset of the interfaces of the interface group includes a first interface of the network device;
storing, in a media access control (MAC) address repository of the network device, a mapping of the first interface of the network device to a source MAC address of a remote device;
receiving a layer two (L2) communication via a second interface of the network device different from the first interface, wherein the L2 communication includes the source MAC address of the remote device;
determining, with the network device, whether the second interface is included within the interface group;
responsive to determining that the second interface is included within the interface group, dynamically updating the MAC address repository to map the second interface to the source MAC address of the remote device; and
responsive to determining that the second interface is not included within the interface group, preventing the source MAC address of the remote device from being mapped to the second interface within the MAC address repository.

2. The method of claim 1, further comprising:
responsive to determining that the first interface and the second interface are each assigned to the same interface group or that the first interface is assigned to a default interface group and the second interface is assigned to a different interface group:
sending an internal message from a first forwarding engine of the network device to a second forwarding engine of the network device, wherein the internal message sent to the second forwarding engine indicates the source MAC address of the remote device, the interface group to which the second interface is assigned and the second interface, and wherein the MAC address repository is a first MAC address repository associated with the first forwarding engine; and
dynamically updating a second MAC address repository associated with the second forwarding engine based on the internal message.

3. The method of claim 2, wherein the internal message sent from the first forwarding engine to the second forwarding engine comprises a MAC learning packet.

4. The method of claim 1, wherein, responsive to determining that the second interface is included within the interface group, dynamically updating the MAC address repository comprises:
removing the mapping of the first interface to the source MAC address from the MAC address repository; and
storing a mapping of the second interface to the source MAC address in the MAC address repository.

5. The method of claim 1, further comprising:
responsive to determining that the first interface is assigned to a default interface group and the second interface is assigned to a different interface group:
removing the mapping of the first interface to the source MAC address of the remote device from the MAC address repository; and
storing a mapping of the second interface to the source MAC address of the remote device in the MAC address repository.

6. The method of claim 1, wherein preventing the MAC address repository from being updated comprises:
dropping the L2 communication; and
preventing the source MAC address from being stored in the MAC address repository when at least one additional L2 communication having the source MAC address is received via the first interface within a configurable time duration, wherein the configurable time duration resets each time an L2 communication having the source MAC address is received via the first interface prior to the configurable time duration expiring.

7. The method of claim 1, wherein the network device is an L2 switch, and wherein the L2 communication is an L2 frame.

8. The method of claim 1, wherein the network device provides layer three (L3) routing functions and L2 forwarding services, and wherein the interfaces of the network device comprise logical interfaces.

9. A network device comprising:
a plurality of physical network interfaces for sending and receiving data;
a set of interfaces, wherein each interface of the set of interfaces corresponds to one of the plurality of physical network interfaces, and wherein each physical network interface has one or more interfaces of the set of interfaces corresponding to the physical network interface;
a control unit comprising an interface group information repository configured to store data defining an interface group comprising a subset of the set of interfaces, wherein the subset of the interfaces of the interface group includes a first interface of the set of interfaces; and
a forwarding engine comprising:
a media access control (MAC) address repository configured to store a mapping of a first interface of the set of interfaces to a source MAC address of a remote network device; and
a MAC address management module configured to determine whether an interface group to which the first interface is assigned is the same interface group as an interface group to which a second interface of the set of interfaces is assigned,
wherein the control unit is configured to receive an L2 communication via the second interface different from the first interface, wherein the L2 communication includes the source MAC address of the remote network device, and
wherein the forwarding engine is configured to:
responsive to the MAC address management module determining that the second interface is included within the interface group, dynamically update the MAC address repository to map the second interface to the source MAC address of the remote network device; and responsive to the MAC address management module determining that the second interface is not included within the interface group, preventing the source MAC address of the remote device from being mapped to the second interface within the MAC address repository.

10. The network device of claim 9, wherein the forwarding engine is configured to dynamically update the MAC address repository by at least being configured to remove the mapping of the first interface to the source MAC address from the MAC address repository, and store a mapping of the second interface to the source MAC address in the MAC address repository.

11. The network device of claim 9, wherein the forwarding engine is further configured to, responsive to the MAC address management module determining that the first interface is assigned to a default interface group and the second interface is assigned to a different interface group, dynamically update the MAC address repository by at least being configured to remove the mapping of the first interface to the source MAC address from the MAC address repository, and store a mapping of the second interface to the source MAC address in the MAC address repository.

12. The network device of claim 9, further comprising:
a second forwarding engine,
wherein the forwarding engine is further configured to send an internal message to the second forwarding engine after dynamically updating the MAC address repository,
wherein the internal message indicates the source MAC address, the interface group to which the second interface is assigned, and the second interface, and
wherein the second forwarding engine comprises a second MAC address repository configured to store a mapping of MAC addresses to the set of interfaces,
wherein the second forwarding engine is configured to dynamically update the second MAC address repository based on the internal message by at least being configured to store a mapping of the second interface to the source MAC address in the second MAC address repository.

13. The network device of claim 9, wherein the MAC address management module is configured to drop the L2 communication and prevent the forwarding engine from dynamically updating the MAC address repository while at least one additional L2 communication having the source MAC address of the remote network device is received via the first interface within a configurable time duration, and wherein the configurable time duration resets each time an L2 communication having the source MAC address is received via the first interface prior to the configurable time duration expiring.

14. The network device of claim 9, wherein the network device is an L2 switch, and wherein the L2 communication is an L2 frame.

15. The network device of claim 9, wherein the network device provides layer three (L3) routing functions and L2 forwarding services, and wherein the set of interfaces of the network device comprise a set of logical interfaces.

16. A computer-readable storage medium encoded with instructions for causing one or more programmable processors to:
store data defining an interface group comprising a subset of a plurality of interfaces of a network device, wherein the subset of the interfaces of the interface group includes a first interface of the network device;
store, in a media access control (MAC) address repository of the network device, a mapping of the first interface of the network device to a source MAC address of a remote device;
receive a layer two (L2) communication via a second interface of the network device different from the first interface, wherein the L2 communication includes the source MAC address of the remote device;
determine whether the second interface is included within the interface group;
responsive to determining that the second interface is included within the interface group, dynamically update the MAC address repository to map the second interface to the source MAC address of the remote device; and
responsive to determining that the second interface is not included within the interface group, preventing the source MAC address of the remote device from being mapped to the second interface within the MAC address repository.

17. The computer-readable storage medium of claim 16, further encoded with instructions for causing one or more programmable processors to:
responsive to determining that the second interface is included within the interface group:
remove the mapping of the first interface to the source MAC address from the MAC address repository; and
store a mapping of the second interface to the source MAC address in the MAC address repository.

18. The computer-readable storage medium of claim 16, further encoded with instructions for causing one or more programmable processors to:
responsive to determining that the first interface is assigned to a default interface group and the second interface is assigned to a different interface group:
remove the mapping of the first interface to the source MAC address of the remote device from the MAC address repository; and
store a mapping of the second interface to the source MAC address of the remote device in the MAC address repository.

19. The computer-readable storage medium of claim 16, further encoded with instructions for causing one or more programmable processors to:
responsive to determining that the first interface and the second interface are each assigned to the same interface group or that the first interface is assigned to a default interface group and the second interface is assigned to a different interface group:
send an internal message from a first forwarding engine of the network device to a second forwarding engine of the network device, wherein the internal message sent to the second forwarding engine indicates the source MAC address of the remote device, the interface group to which the second interface is assigned, and the second interface, and wherein the MAC address repository is a first MAC address repository associated with the first forwarding engine; and
dynamically update a second MAC address repository associated with the second forwarding engine based on the internal message.

20. The computer-readable storage medium of claim 16, further encoded with instructions for causing one or more programmable processors to:
in response to determining that the first interface and the second interface are each assigned to different interface groups, both drop the L2 communication and prevent the MAC address repository from being dynamically updated while at least one additional L2 communication having the source MAC address is received via the first interface within a configurable time duration, and wherein the configurable time duration resets each time an L2 communication having the source MAC address is received via the first interface prior to the configurable time duration expiring.

* * * * *